United States Patent [19]

Ichikawa et al.

[11] Patent Number: 5,785,450
[45] Date of Patent: Jul. 28, 1998

[54] STRUCTURE FOR COUPLING STEERING WHEEL AND ROTARY CONNECTOR OF VEHICLE

[75] Inventors: Hidehiro Ichikawa; Nobuhiko Suzuki; Satoshi Ishikawa, all of Shizuoka-ken, Japan

[73] Assignee: Yazaki Corporation, Tokyo, Japan

[21] Appl. No.: 640,659

[22] Filed: May 1, 1996

[30] Foreign Application Priority Data

May 2, 1995 [JP] Japan ................... 7-108453

[51] Int. Cl.⁶ ................................................ B25G 3/20
[52] U.S. Cl. ................... 403/368; 403/365; 403/225; 74/552
[58] Field of Search ........................... 403/365, 367, 403/368, 372, 220, 223, 225, 228; 74/552

[56] References Cited

U.S. PATENT DOCUMENTS

| 2,062,290 | 12/1936 | Bott .................... 403/368 X |
| 2,468,311 | 4/1949 | Grotenhuis .................... 403/228 |
| 2,578,809 | 12/1951 | Ketchum .................... 403/225 X |
| 3,515,417 | 6/1970 | Bowman .................... 403/372 X |
| 5,588,854 | 12/1996 | Ikumi et al. .................... 439/164 |

FOREIGN PATENT DOCUMENTS

| 0 291 391A1 | 11/1988 | European Pat. Off. . |
| 680434 | 1/1930 | France .................... 403/228 |
| 871231 | 3/1953 | Germany .................... 403/372 |
| 43 22 443 A1 | 1/1995 | Germany . |
| 5-28777 | 4/1993 | Japan . |
| 7-3594 | 1/1995 | Japan . |

*Primary Examiner*—Brian K. Green
*Assistant Examiner*—William L. Miller
*Attorney, Agent, or Firm*—Finnegan, Henderson, Farabow, Garrett & Dunner, L.L.P.

[57] ABSTRACT

Pins are arranged on the upper surface of a rotary case of a rotary connector for electrically connecting the steering wheel and the steering column of a vehicle by a flexible flat cable, while the steering wheel is provided on the lower surface thereof with coupling holes for respectively receiving a corresponding pin in order to securely hold the rotary case. Each of the pins is provided with an elastic silicon rubber cap. The elastic cap comprises a cylindrical main body and a plurality of elastic members extending longitudinally along the axis of the cylindrical section. When viewed from above, the elastic members show an arcuately curved and tapered profile projecting from the base toward the tip.

3 Claims, 10 Drawing Sheets

STRUCTURE FOR COUPLING STEERING WHEEL AND ROTARY CONNECTOR OF VEHICLE

BACKGROUND OF THE INVENTION

1. Field of the Invention

This invention relates to a structure for coupling the steering wheel and a rotary connector of a vehicle by inserting projections arranged on the rotary case of the rotary connector having a cable for electrically connecting the steering wheel and the steering column into corresponding respective coupling holes arranged on the steering wheel.

2. Prior Art

In recent years, the steering wheel of a vehicle is more often than not equipped with a variety of electric and electronic switches to reflect the trend of electronization of vehicles. These switches need to be connected to the steering column by wires. As the steering wheel has to be turned frequently clockwise and counterclockwise while the vehicle is in motion and may make several full turns sometimes, a so-called rotary connector has been devised to ensure electric connection between the steering wheel and the steering column. A rotary connector comprises a flexible flat cable (FFC) that contains a plurality of wires and is wound helically between a rotary member secured to the steering shaft and a stationary member secured to the steering column or in the form of a reversed helix where the cable winding is reversed once.

FIG. 12 is an exploded schematic perspective view of a typical rotary connector and FIG. 13 is a schematic sectional lateral view of the rotary connector illustrating how it is assembled. The rotary connector comprises cylindrical first and second rotary members 1 and 3 designed to receive the steering shaft and to be secured to the latter, a cover 5 and an under-cover 7 designed to rotatably support the rotary members from the outer periphery thereof and to be secured to the steering column (not shown) as stationary members, and a FFC 11 being contained within an annular space 9 arranged between said rotary members and said stationary members.

An internal gear 13 for containing the FFC 11 is rigidly held in-the cover 5 and the under-cover 7. The internal gear 13 is provided with a gear section 15 in a lower portion along the inner peripheral surface thereof. A carrier 19 is arranged between a lower flange 13a of the internal gear 13 and a corresponding lower flange 1a of the first rotary member 1 in such a way that the carrier 19 is rotatable relative to both of them. The carrier 19 has a number of upwardly projecting pins 19a for rotatably receiving respective guide rollers 21 designed to guide the FFC 11. The carrier 19 also has three downwardly projecting pins 19b for rotatably receiving respective planet gears 23 designed to mesh with the gear section 15 of the internal gear 13. The planet gears 23 also mesh with a gear section 25 arranged in a lower portion of the first rotary member 1 along the outer peripheral surface thereof so that, as the first rotary member 1 rotates to drive the planet gears 23 to revolve, the carrier 19 is rotated by the rotary motion of the planet gears at a rate having a predetermined reduction ratio relative to the rate of rotation of the first rotary member 1.

As indicated by broken lines in FIG. 14 that schematically illustrates how the FFC 11 is housed, the FFC 11 has its inner end rigidly secured to an anchor section 26 of the first rotary member 1 and provided with a connector 27. The internal gear 13 is not shown in FIG. 14. The FFC 11 is drawn out from the connector 27 and wound along the outer peripheral surface of the first rotary member 1 and then around one of the guide rollers 21 to reverse its direction and produce a reversing section 11a there before it is wound along the internal peripheral surface of the internal gear 13 in a direction opposite to the original winding direction. Thereafter, the FFC 11 is drawn out of the internal gear 13 through a notch 13b and rigidly secured to a protruding section 31 of the under-cover 7 at the front end by way of a connector 29.

An upper-cover 33 that rotates with the first and second rotary members 1, 3 is arranged on the cover 5 and the connector 27 of the inner end of the FFC 11 is rigidly secured to another anchor section 33a arranged on the upper-cover 33. The upper-cover 33 is provided with three screw receiving holes 33b and the second rotary member 3 is provided on the upper surface thereof with three bosses 35 projecting upward and arranged at positions corresponding to the respective screw receiving holes 33b. The bosses 35 are inserted into a groove 37 formed on the lower surface of the first rotary member 1 until their front ends touch the lower surface of another flange 39 of the first rotary member 1. The flange 39 is provided with screw receiving holes 39a so that the rotary members and the housing are put together by driving three screws 41 into respective threaded bores 35a of the second rotary member 3 by way of the respective screw receiving holes 33b of the upper-cover 33 and the respective screw receiving holes 33a of the first rotary member 1.

The FFC 11 has a length adapted to a situation where the steering wheel makes several full turns at a time. Referring to FIG. 14, if the first rotary member 1 is rotated clockwise, the portion of the FFC 11 wound around the outer periphery of the first rotary member 1 is unwound or loosened and simultaneously wound on along the inner periphery of the internal gear 13. If, on the other hand, the first rotary member 1 is rotated counterclockwise, the portion of the FFC 11 wound around the inner periphery of the internal gear 13 is unwound or loosened and simultaneously wound on along the outer periphery of the first rotary member 1. The FFC 11 is guided by the corresponding guide roller 21 and the reversing section 11a moves circumferentially (in either of the directions indicated by arrows A) in the housing along with the guide rollers 21 and the carrier 19.

The upper-cover 33 carries thereon an indicator label 43 and is provided with a pin 45 projecting upward and covered by a cap 47 made of silicon rubber. The upper-cover 33 of the rotary connector is secured to the steering wheel when the pin 45 with the cap 47 put thereon is inserted into a coupling hole arranged on the lower surface of the steering wheel (not shown). On the other hand, the under-cover is secured to the steering column by means of a fitting hole 7a. Japanese Utility Model Application Laid-Open No. 7-3594 discloses a rubber cap 47 to be put on a pin 45. By using a rubber cap 47, any impact applied to the pin 45 that is inserted into the coupling hole and any jolting noise that may be given rise to by the pin 45 in the coupling hole while the vehicle is in motion can be alleviated.

Japanese Utility Model Application Laid-Open No. 5-28777 discloses the use of a projection corresponding to the pin 45 described above that is integrally formed with a resin made upper-cover of a rotary connector and also with a pair of elastic members arranged around it. The elastic members extend slantingly downward from the front end of the projection toward the base thereof in such a way that, when they are inserted into a coupling hole on the steering wheel, they are pressed by the inner surface of the coupling hole and elastically deformed toward the center axis so that they may effectively prevent any jolting noise from being produced by the projection in the coupling hole.

However, with any known coupling structures of the type under consideration, while the generation of jolting noise as described above can be prevented so long as the outer surface of the cap or the elastic members is tightly held in contact with the inner surface of the coupling hole, they are inevitably accompanied by the problem of such noise that may be generated when the vehicle is running if there is a gap, even if slightly, between the coupling hole and the cap or the elastic members.

SUMMARY OF THE INVENTION

It is the object of the present invention to provide a structure for coupling the steering wheel and a rotary connector of a vehicle that is free from jolting noise if there is a gap between a coupling hole and a projection received in each of the coupling holes of the structure.

According to the invention, the above object is achieved by providing a structure for coupling the steering wheel and a rotary connector of a vehicle, comprising: a steering wheel provided with one or more coupling holes; a rotary connector having a rotary case rotatable with the steering wheel and provided with one or more projections to be respectively received in the one or more coupling holes, a stationary case to be rigidly secured to the steering column of the vehicle and a cable helically wound between the rotary case and the stationary case for electrically connecting the steering wheel and the steering column; and one or more elastic caps each having a cylindrical main body for receiving a corresponding projection and elastic members formed integrally with and circumferentially around the main body on the outer periphery thereof and projecting outwardly therefrom.

With such an arrangement, the elastic members operate as shock absorbers to alleviate any impact applied to the projection even when there is a significant gap between the outer periphery of the elastic cap put on the projection and the inner periphery of the coupling hole and the steering wheel and the rotary case of the rotary connector move relative to each other to close the gap.

In a preferred embodiment, the elastic members of each of the elastic caps extend longitudinally along the axis of the cylindrical section and, when viewed from above, they show an arcuately curved and tapered profile projecting from the base toward the tip.

In another preferred embodiment, the elastic members of each of the elastic caps extend longitudinally along the axis of the cylindrical section and, when viewed from above, they show a projecting profile and contain respective spaces therein.

In further preferred embodiment, when put on a projection, the elastic cap shows radial outer dimensions that are largest at the base of the pin and decreases toward the front end to show a tapered profile.

The nature, principle and utility of the invention will become more apparent from the following detailed description when read in conjunction with the accompanying drawings.

DETAILED DESCRIPTION OF THE PREFERRED EMBODIMENTS

Now, the present invention will be described in greater detail by referring to the accompanying drawings that illustrate preferred embodiments of the invention.

Figure 1:
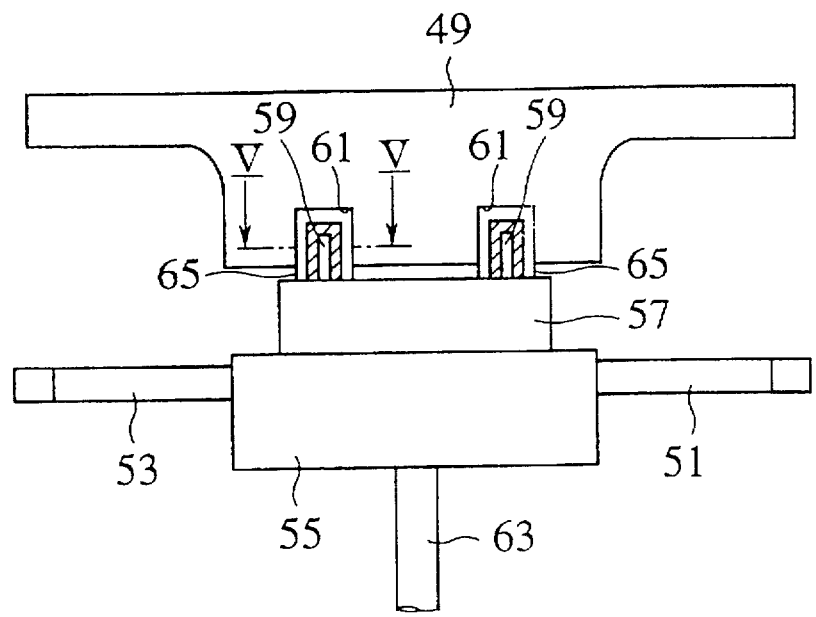
FIG. 1 is a schematic sectional lateral view of the rotary connector of an embodiment of the invention arranged between the steering wheel and the steering column of a vehicle.
Figure 12:
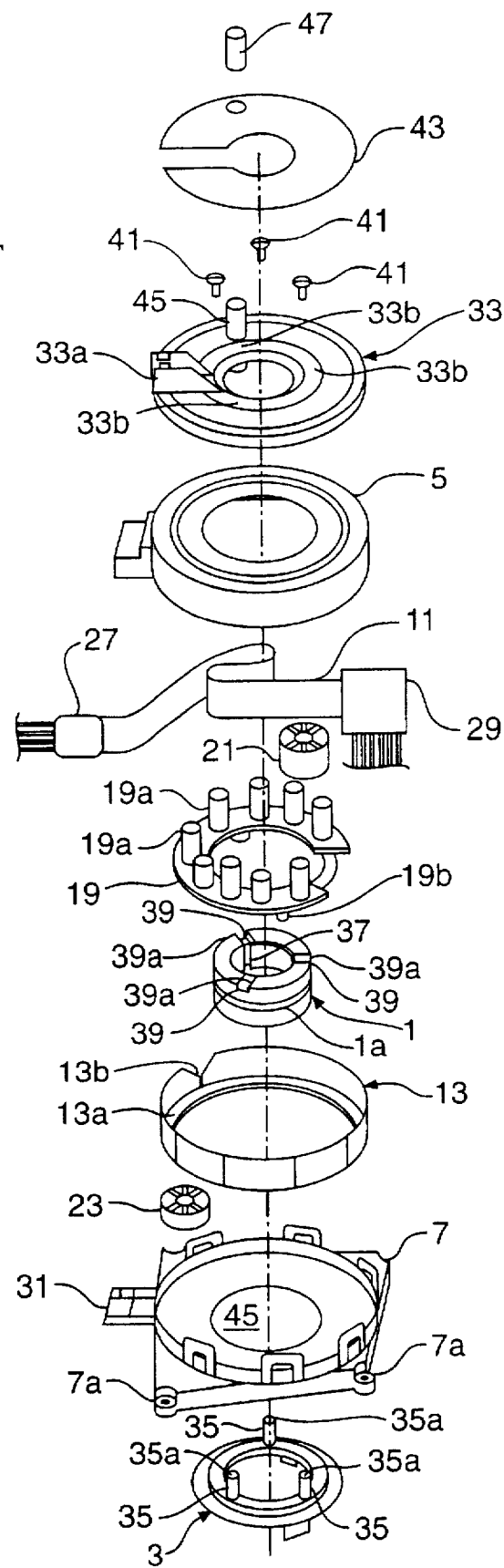
FIG. 12 is an exploded schematic perspective view of a known rotary connector.
Figure 13:
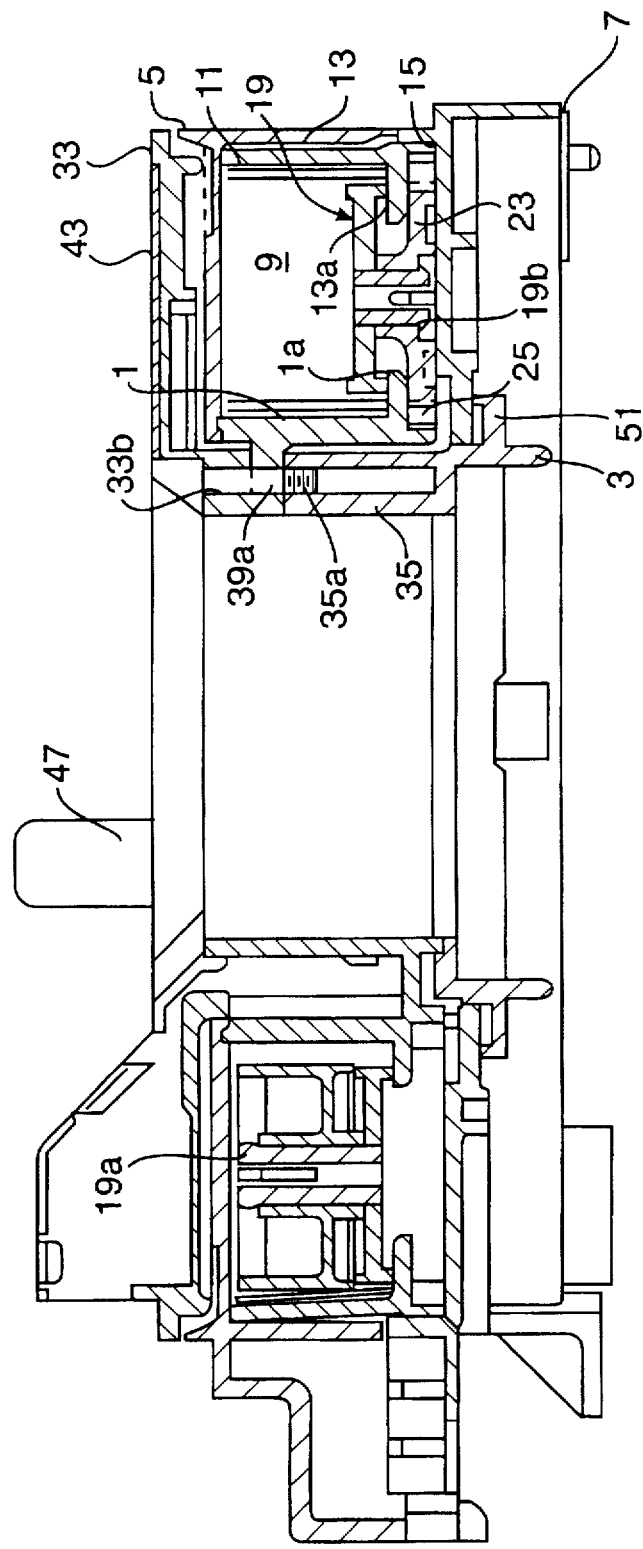
FIG. 13 is a schematic sectional lateral view of the rotary connector of FIG. 12 when it is assembled.
Figure 14:
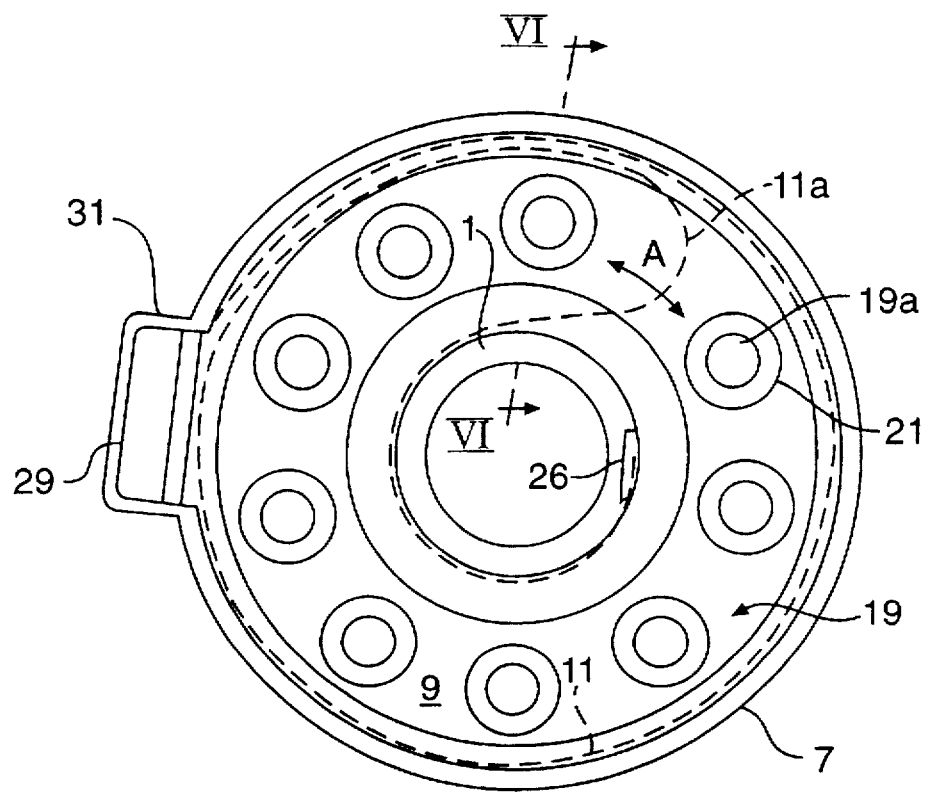
FIG. 14 is a schematic sectional plan view of part of the rotary connector of FIG. 12, illustrating how the FFC is housed in it.

FIG. 1 is a schematic sectional lateral view of the rotary connector 57 of a first embodiment of the invention arranged between the steering wheel 49 and the steering column 55 (which, for the purpose of the present invention, refers to a column switch unit comprising a switch lever 51 for operating the turn signal lamps and turning on/off the head lights and another switch lever 53 for operating the window wiper) of a vehicle. The rotary connector 57 has a configuration substantially same as that of the known rotary connector illustrated in FIGS. 12 through 14. More specifically, a pair of pins 59 are integral with an upper-cover 33 and projecting upward from the upper surface of the latter, which operates as a rotary case. As the pins 59 are inserted into respective coupling holes 61 formed on the lower surface of the steering wheel 49 of a vehicle, the steering wheel 49 is rigidly secured to the upper-cover 33. On the other hand, an under-cover 7 that operates as a stationary case of the rotary connector 57 is fitted to the steering column 55 of the vehicle by way of anchor holes 7a.

The steering shaft 63 to be secured to the steering wheel 49 is inserted into a first rotary body 1 of the rotary connector 57 and, at the same time, rotatably inserted into the steering column 55.

Figure 2:
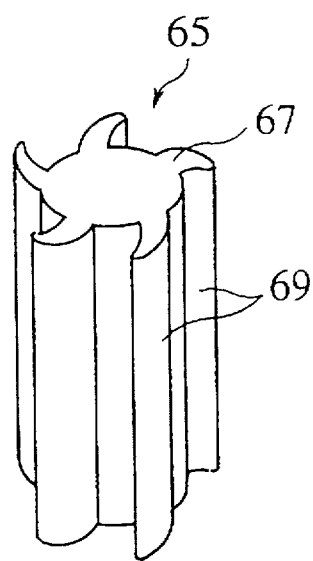
FIG. 2 is a schematic perspective view of one of the elastic caps of the embodiment of FIG. 1.
Figure 3:
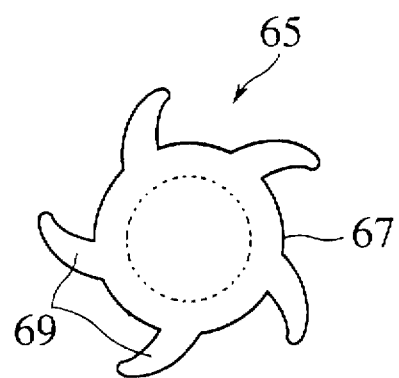
FIG. 3 is a schematic plan view of the elastic cap of FIG. 2.
Figure 4:
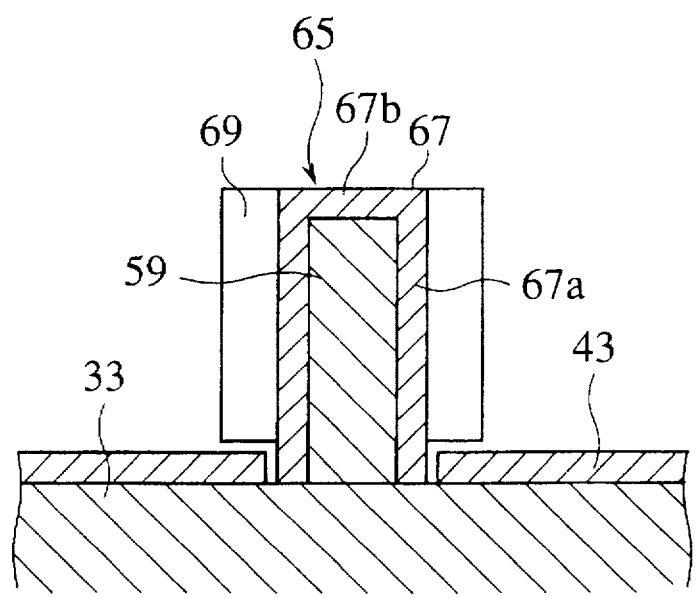
FIG. 4 is a schematic sectional lateral view of the elastic cap of FIG. 2 fitted to the corresponding projection.

FIGS. 2 and 3 show a perspective view and a plan view of one of the pins 59 of the upper-cover 33, which is provided with an elastic cap 65 as seen from FIG. 4. The elastic cap 65 is made of silicon rubber and comprises a main body 67 that receives the pin 59 and a plurality of outwardly projecting elastic members 69 integrally formed with and arranged at regular intervals on the outer periphery of the main body 57.

The main body 67 has a cylindrical section 67a and a bottom section 67b and the pin 59 is held tightly in contact with the inner surfaces of these sections. The elastic members 69 extend longitudinally along the axis of the cylindrical section 67a and, when viewed from above, they show an arcuately curved and tapered profile projecting from the base toward the tip. The elastic members 69 are so configured in terms of the length from the base to the tip and the interval separating adjacent ones that, when they are elastically bent toward the outer periphery of the cylindrical section 67a, any of them would not be laid on the adjacent one.

Figure 5A:
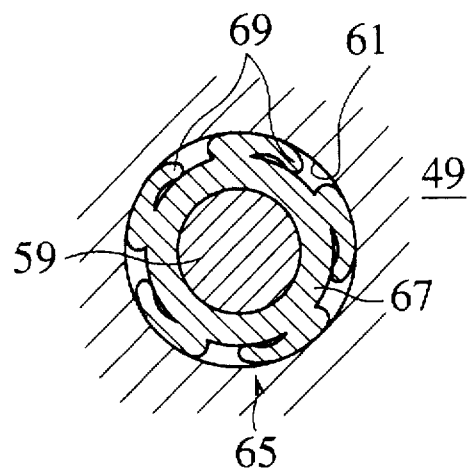
FIGS. 5A through 5C are enlarged schematic sectional plan views taken along the line A—A in FIG. 1, showing that the matching coupling hole has small, medium and large diameters respectively.
Figure 5B:
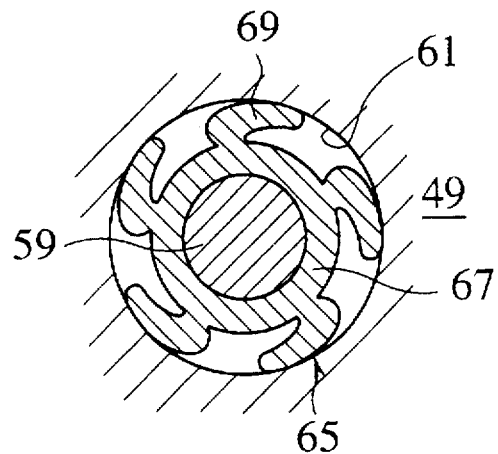
Figure 5C:
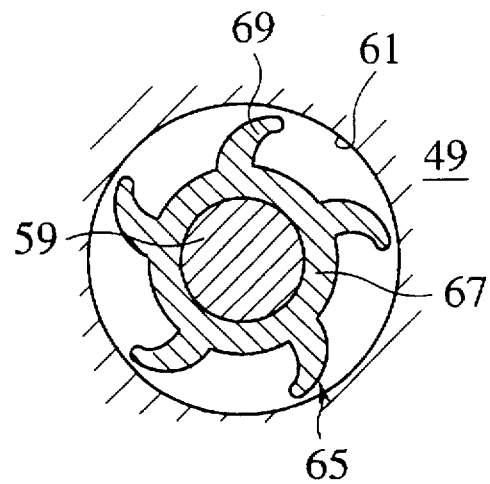

FIGS. 5A through 5C are enlarged schematic sectional plan views of the elastic cap of FIG. 1 taken along line A—A, showing that the coupling hole 61 of the steering wheel 49 has small, medium and large diameters respectively.

FIG. 5A shows a coupling hole 61 having a small diameter. In this case, the elastic members 69 are pressed by the peripheral wall of the coupling hole 61 against the outer periphery of the cylindrical section 67a to become almost flat. FIG. 5B shows a coupling hole 61 having a medium diameter. The elastic members 69 are also pressed by the peripheral wall of the coupling hole 61 but bent down only slightly. In either case, the elastic members 69 are tightly pressed against the peripheral wall of the coupling hole 61 and, therefore, no jolting noise is generated there even when the elastic members 69 are shaken in the coupling hole 61 as the vehicle is driven to move on.

However, in FIG. 5C, the coupling hole 61 has a large diameter and the tips of the elastic members 69 are not in contact with the peripheral wall of the coupling hole 61 when the pin 59 equipped with an elastic cap 65 is aligned with the coupling hole 61. In this case, although a clearance is left between the tips of the elastic members 69 and the peripheral wall of the coupling hole 61, the silicon rubber elastic members 69 operate as so many cushions that absorb any impact that may be applied to the steering wheel 49 and the rotary connector 57 to consequently bring any of the elastic members 69 to collide with the inner periphery of the coupling hole 61 as the vehicle is shaken when it is in motion.

Figure 6:
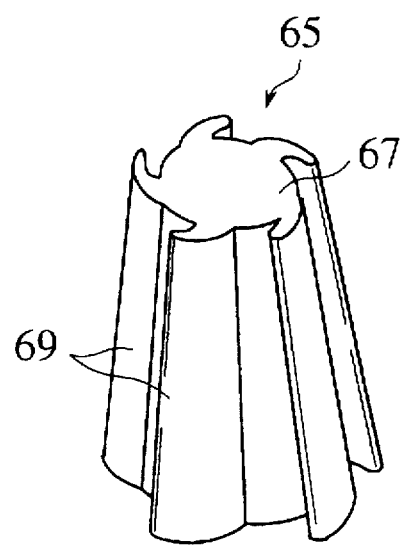
FIG. 6 is a schematic perspective view of an elastic cap obtained by modifying the cap of FIG. 2.

FIG. 6 is a schematic perspective view of an elastic cap obtained by modifying cap 65 of FIG. 2. When put on a pin 59, it shows radial outer dimensions that are largest at the base of the pin 59 and decreases toward the front end to show a tapered profile. Since the front end of the cap is dimensionally small, the pin can be inserted into the corresponding coupling hole 61 without difficulty.

Figure 7:
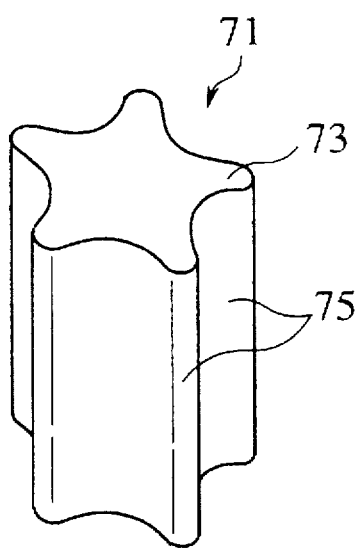
FIG. 7 is a schematic sectional perspective view of the elastic cap of another embodiment of the invention.
Figure 8:
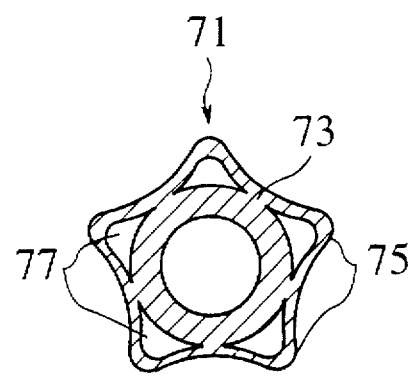
FIG. 8 is a schematic plan view of the elastic cap of FIG. 7.
Figure 9:
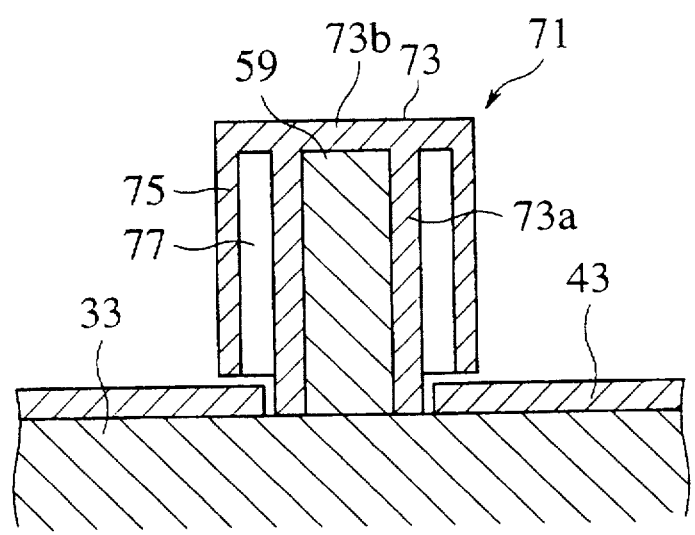
FIG. 9 is a schematic sectional lateral view of the elastic cap of FIG. 7 fitted to the corresponding projection.

FIG. 7 is a schematic sectional perspective view of one of the elastic caps 71 of another embodiment of the invention. FIG. 8 is a schematic plan view of the elastic cap 71 of FIG. 7. FIG. 9 is a schematic sectional lateral view of the elastic cap 71 of FIG. 7 fitted to the corresponding pin 59 of the upper-cover 33. The elastic cap 71 is made of silicon rubber as its counterpart of FIG. 2 and comprises a main body 73 that receives the pin 59 and a plurality of outwardly projecting elastic members 75 integrally formed with and arranged at regular intervals on the outer periphery of the main body 73.

The main body 73 has a cylindrical section 73a and a bottom section 73b and the pin 59 is held tightly in contact with the inner surfaces of these sections. The elastic members 75 extend longitudinally along the axis of the cylindrical section 73a and, when viewed from above, they show a projecting profile and contain respective spaces 77 therein.

Figure 10A:
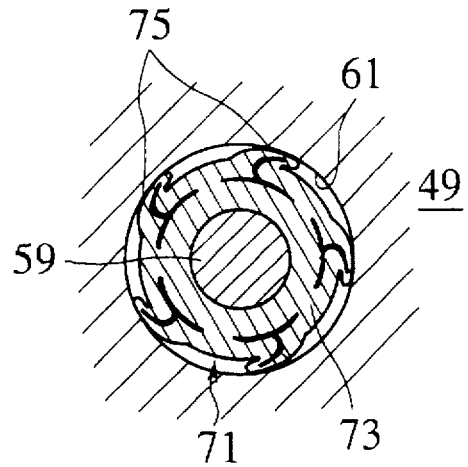
FIGS. 10A through 10C are enlarged schematic sectional plan views, similar to FIGS. 5A through 5C, taken along the line A—A in FIG. 1, showing that the matching coupling hole has small, medium and large diameters respectively.
Figure 10B:
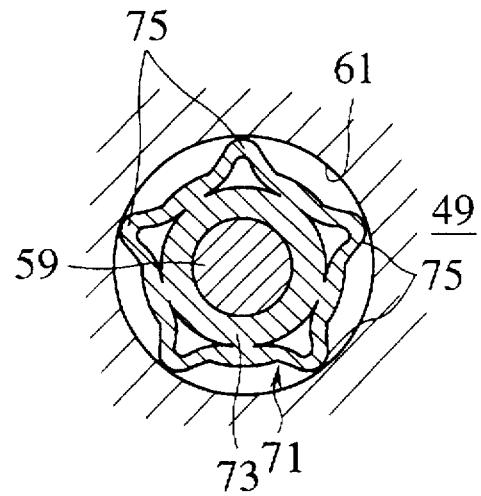
Figure 10C:
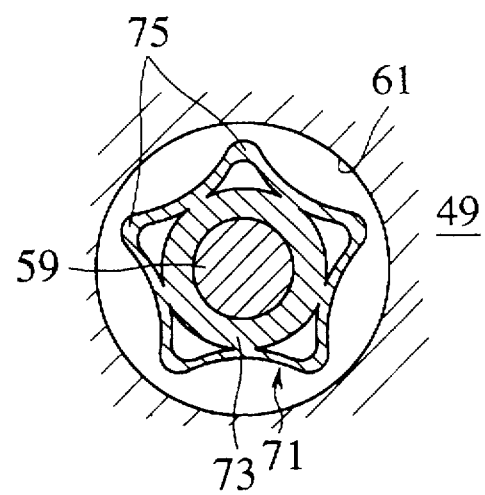

FIGS. 10A through 10C are enlarged schematic sectional plan views of the elastic cap of FIG. 7 similar to FIGS. 5A through 5C, showing that the matching coupling hole 61 of the steering wheel 49 has small, medium and large diameters respectively.

FIG. 10A shows a coupling hole 61 having a small diameter. In this case, the elastic members 75 are pressed by the peripheral wall of the coupling hole 61 against the outer periphery of the cylindrical section 73a to become almost flat and the internal spaces are almost lost. FIG. 10B shows a coupling hole 61 having a medium diameter. The elastic members 75 are also pressed by the peripheral wall of the coupling hole 61 but pushed down only slightly to make the spaces 77 slightly smaller. In either case, the elastic members 75 are tightly pressed against the peripheral wall of the coupling hole 61 and, therefore, no jolting noise is generated there even when the elastic members 75 are shaken in the coupling hole 61 as the vehicle is driven to move on.

However, in FIG. 10C, the coupling hole 61 has a large diameter and the tips of the elastic members 75 are not in contact with the peripheral wall of the coupling hole 61 when the pin 59 equipped with an elastic cap 71 is aligned with the coupling hole 61. In this case, although a clearance is left between the tips of the elastic members 75 and the peripheral wall of the coupling hole 61, the silicon rubber elastic members 75 operates as so many cushions that absorb any impact that may be applied to the steering wheel 49 and the rotary connector 57 to consequently bring any of the elastic members 75 to collide with the inner periphery of the coupling hole 61 as the vehicle is shaken when it is in motion.

Figure 11:
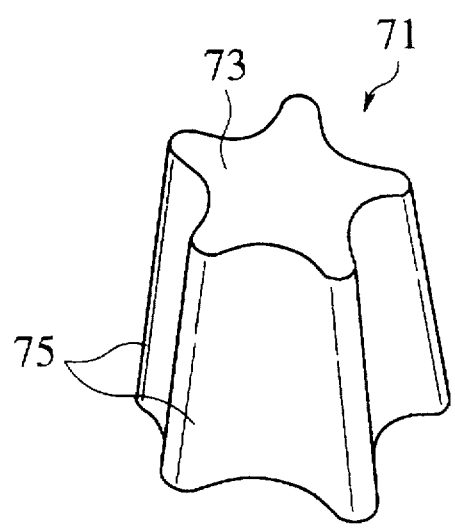
FIG. 11 is a schematic perspective view of an elastic cap obtained by modifying the cap of FIG. 7.

FIG. 11 is a schematic perspective view of an elastic cap obtained by modifying the cap 71 of FIG. 7. When put on a pin 59, it shows radial outer dimensions that are largest at the base of the pin 59 and decreases toward the front end to show a tapered profile. Since the front end of the cap is dimensionally small, the pin can be inserted into the corresponding coupling hole 61 without difficulty.

In the above described embodiments, the main bodies 67, 63 of the elastic caps 65, 71 may be devoid of the respective bottom sections 67b, 73b.

As described above, according to the invention, if a pin is provided with an elastic cap and still loosely housed in a coupling hole with a gap disposed therebetween and the steering wheel and the rotary case of the rotary connector are moved relative to each other so as to reduce the gap, the elastic members arranged on the elastic cap can absorb any shock applied to them to prevent any jolting noise from being generated.

It should be understood that many modifications and adaptations of the invention will become apparent to those skilled in the art and it is intended to encompass such obvious modifications and changes in the scope of the claims appended hereto.

What is claimed is:

1. A steering assembly for a vehicle comprising:

a steering wheel having a coupling hole;

a rotary connector having a rotary case rotatable with said steering wheel and a projection projecting into said coupling hole; and an elastic cap insertable on said projection, said elastic cap having a cylindrical main body for receiving said projection, said cylindrical main body having a longitudinal axis, and a plurality of elastic members formed integrally with the main body and projecting from a circumference of the main body to define a generally star-shaped pattern, said projecting elastic members each defining a space between a distal end of the projecting elastic member and the circumference of said main body, said main body having a tapered profile along the longitudinal axis.

2. A steering assembly according to claim 1, herein said elastic cap has first and second ends, and a radius of said cap at the first end is greater than a radius of said cap at the second end.

3. A steering assembly for a vehicle comprising:

a steering wheel having a coupling hole;

a rotary connector having a rotary case rotatable with said steering wheel and a projection projecting into said coupling hole; and an elastic cap insertable on said projection, said elastic cap having a cylindrical main body for receiving said projection, said cylindrical main body having a longitudinal axis, and a plurality of elastic members formed integrally with and circumferentially around said main body on an outer periphery thereof and projecting outwardly therefrom, each elastic member extending longitudinally along an axis of the cylindrical main body and, when viewed from above, showing a projecting profile containing a space therein, said main body having a tapered profile along the longitudinal axis.

* * * * *

UNITED STATES PATENT AND TRADEMARK OFFICE
CERTIFICATE OF CORRECTION

PATENT NO. : 5,785,450
DATED : July 28, 1998
INVENTOR(S) : ICHIKAWA et al.

It is certified that error appears in the above-indentified patent and that said Letters Patent is hereby corrected as shown below:

column 4, line 8, "A—A" should read --V—V--.

column 4, line 21, "A—A" should read --V—V--.

Column 5, line 18, "A-A" should read--V-V--.

Claim 2, column 7, line 12, "herein" should read --wherein--.

Signed and Sealed this

Twenty-eighth Day of December, 1999

Attest:

Q. TODD DICKINSON

Attesting Officer

Acting Commissioner of Patents and Trademarks